United States Patent
Quan et al.

(10) Patent No.: US 11,265,760 B2
(45) Date of Patent: Mar. 1, 2022

(54) METHOD AND DEVICE FOR DECOMPRESSING AND COMPRESSING UPLINK DATA

(71) Applicant: CHINA ACADEMY OF TELECOMMUNICATIONS TECHNOLOGY, Beijing (CN)

(72) Inventors: Haiyang Quan, Beijing (CN); Wei Bao, Beijing (CN); Yu Qiu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 54 days.

(21) Appl. No.: 16/608,726

(22) PCT Filed: Mar. 8, 2018

(86) PCT No.: PCT/CN2018/078451
§ 371 (c)(1),
(2) Date: Oct. 25, 2019

(87) PCT Pub. No.: WO2018/196491
PCT Pub. Date: Nov. 1, 2018

(65) Prior Publication Data
US 2020/0396640 A1 Dec. 17, 2020

(30) Foreign Application Priority Data

Apr. 28, 2017 (CN) .......................... 201710296106.4

(51) Int. Cl.
*H04W 56/00* (2009.01)
*H04W 28/06* (2009.01)
(Continued)

(52) U.S. Cl.
CPC ......... *H04W 28/06* (2013.01); *H04L 67/2823* (2013.01); *H04L 69/04* (2013.01); *H04L 69/22* (2013.01); *H04W 80/08* (2013.01)

(58) Field of Classification Search
CPC .. H04W 28/06; H04W 80/08; H04L 67/2823; H04L 69/04; H04L 69/22
(Continued)

(56) References Cited

U.S. PATENT DOCUMENTS

2015/0271816 A1  9/2015  Akkarakaran et al.
2016/0142518 A1* 5/2016  Raina ...................... H04L 69/04
                                                     370/230
(Continued)

FOREIGN PATENT DOCUMENTS

| CN | 106105341 A | 11/2016 |
| CN | 106302245 A | 1/2017 |
| CN | 107094142 A | 8/2017 |

OTHER PUBLICATIONS

Extended European Search Report from EP app. No. 18790848.8, dated Mar. 20, 2020.
(Continued)

*Primary Examiner* — Sai Ming Chan
(74) *Attorney, Agent, or Firm* — Ladas & Parry, LLP (57) ABSTRACT

A method and a device for decompressing and compressing uplink data are provided. The method for decompressing uplink data includes: checking, by a decompression end, a UDC header in a PDCP packet after the PDCP packet is received, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression (Continued)

end; and performing, by the decompression end, a corresponding operation on the data packet in the PDCP packet according to the compression context information and the information related to the decompression buffer area.

13 Claims, 6 Drawing Sheets

(51) Int. Cl.
    *H04L 67/565*     (2022.01)
    *H04L 69/04*     (2022.01)
    *H04L 69/22*     (2022.01)
    *H04W 80/08*     (2009.01)

(58) Field of Classification Search
    USPC ........................................................ 370/329
    See application file for complete search history.

(56) References Cited

U.S. PATENT DOCUMENTS

2016/0142934 A1    5/2016    Ahmadsadeh et al.
2016/0309364 A1*  10/2016  Maheshwari ........... H04L 69/04
2016/0337255 A1*  11/2016  Balasu ................... H04L 69/22

OTHER PUBLICATIONS

International Search Report and Written Opinion of the International Searching Authority from PCT/CN2018/078451, dated May 30, 2018, with English translation from WIPO.
International Preliminary Report on Patentability from PCT/CN2018/078451, dated October 29, 2019, with English translation from WIPO.
"A Low-Complexity Uplink Data Compression Solution", 3GPP TSG-RAN WG2 Meeting #97bis, Spokane, USA, Apr. 3-7, 2017.

* cited by examiner

METHOD AND DEVICE FOR DECOMPRESSING AND COMPRESSING UPLINK DATA

CROSS-REFERENCE TO RELATED APPLICATIONS

The present application is the U.S. national phase of PCT Application No. PCT/CN2018/078451 filed on Mar. 8, 2018, which claims a priority to Chinese patent application No. 201710296106.4 filed on Apr. 28, 2017, the disclosures of which are incorporated in their entireties by reference herein.

TECHNICAL FIELD

The present disclosure relates to the field of communication technology, and in particular to a method and a device for decompressing and compressing uplink data.

Figure 1:
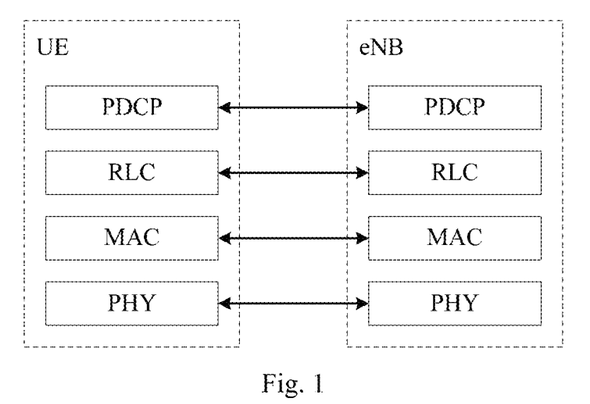
FIG. 1 a schematic view of a user plane protocol stack.

BACKGROUND (1) Data Transmission Process of a Mobile Communication System in the Related Technologies Data transmission between a User Equipment (UE) and an evolved Node B (eNB) is usually achieved via a Packet Data Convergence Protocol (PDCP) layer, a Radio Link Control (RLC) layer, a Media Access Control (MAC) layer and a Physical Layer (PHY), where different data processing is completed in each layer. The PDCP layer is mainly responsible for security operations and header compression/decompression processing, such as encryption and integrity protection, Robust Header Compression (ROHC) compression and decompression, etc.; the RLC layer is mainly responsible for segmented cascading and in-sequence delivery of data and data transmission guarantee of Automatic Repeat-reQuest (ARQ); the MAC layer is mainly responsible for scheduling, cascade processing of different logical channels and Hybrid Automatic Repeat reQuest (HARQ) operation; and the physical layer is responsible for transport block packetization and air interface transmission. FIG. 1 shows a schematic view of a user plane protocol stack.

(2) Data Processing by the PDCP Layer

Figure 2:
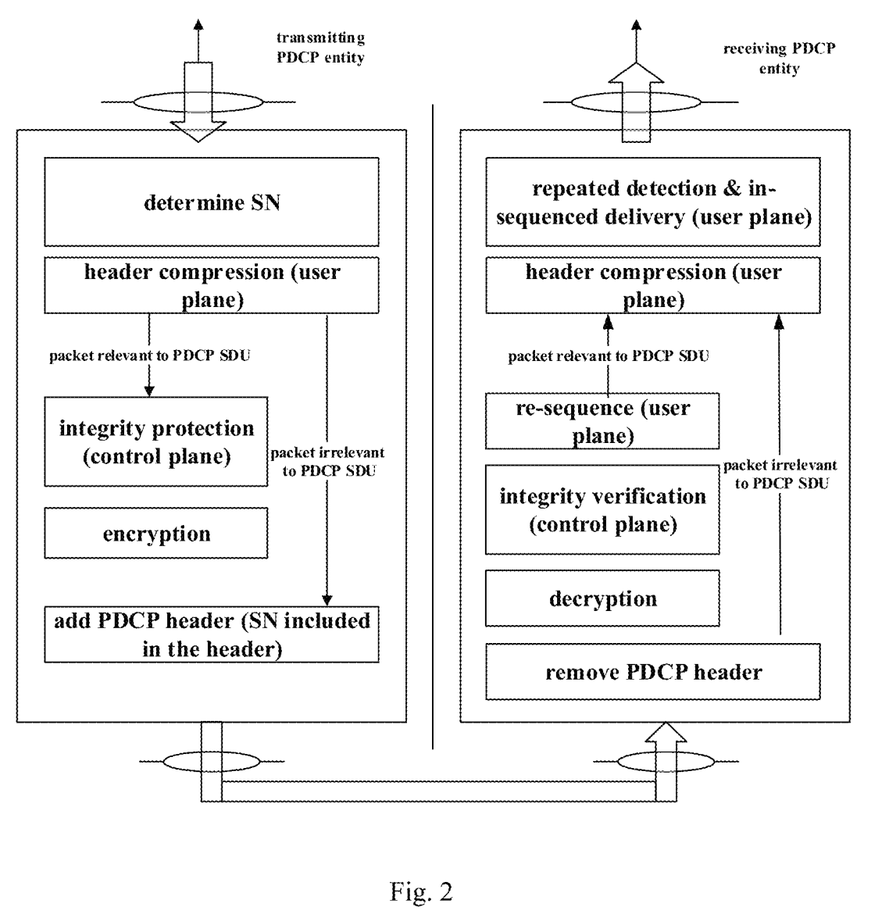
FIG. 2 is a schematic view of a data processing flow at a PDCP layer.

The main functions of the PDCP layer are security related operations (encryption/decryption, integrity protection/verification) and header compression/decompression processing. The specific data processing flow is shown in FIG. 2.

Figure 3:
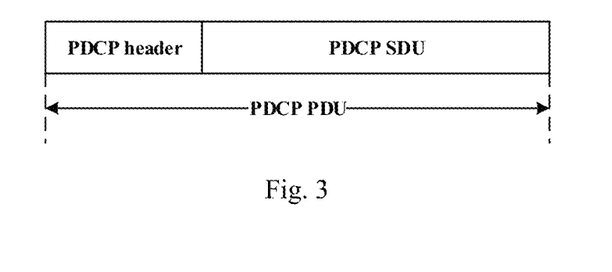
FIG. 3 is a schematic view of a PDCP PDU structure.

The transmitting PDCP entity generates a PDCP PDU (Protocol Data Unit) after processing the received Internet Protocol (IP) data packet. The structure of the PDCP PDU is shown in FIG. 3, and the PCPC layer SN (Sequence Number) is included in the PDCP header.

(3) Operation Mechanism of Uplink Data Compression

The uplink data compression is performed by the UE for the uplink application layer data or signaling, where the compressed data is decompressed on a base station side, to save the amount of data transmitted via air interface and save uplink resources.

At present, there are two possible solutions in consideration for the UE side and the base station sides to keep correct decompression. One solution is that the UE establishes data content in a compression buffer in the process of transmitting the uplink data, and it is reserved on the base station side. Then, decompression is performed according to a corresponding rule. The other solution is that the UE and the base station download predefined profile information or save profile information for decompression in advance, and can determine which profile will be started according to some signaling interaction. Once an agreement is reached, the UE and the base station can ensure correct compression and decompression.

The profile information includes a compression method, and information of the decompression buffer or decompression mapping.

Figure 4:
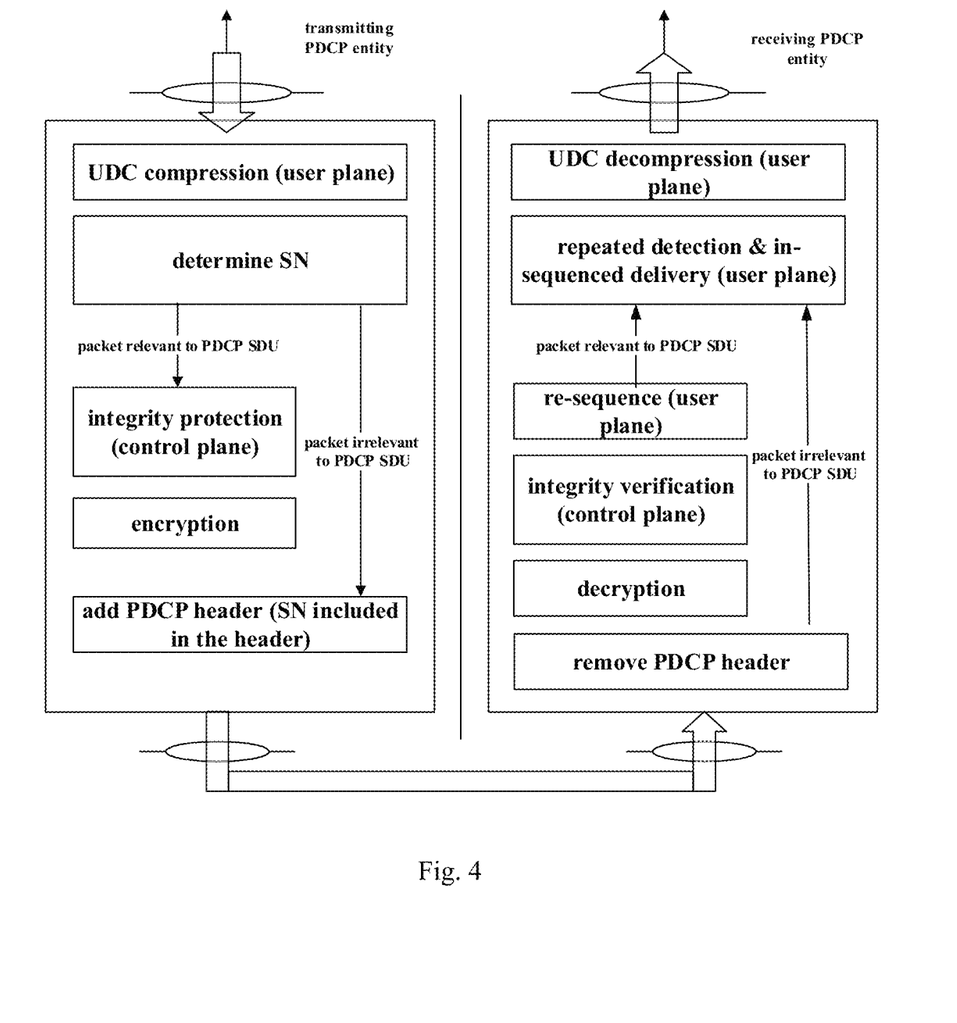
FIG. 4 is a schematic view showing a location of a UDC in a PDCP data processing flow.

In the processing flow of the PDCP layer, uplink data compression can replace the ROHC compression, as shown in FIG. 4.

In the study of Uplink Data Compression (UDC) of a radio mobile communication system, the UE starts the UDC function according to the configuration of the network, and compresses the uplink data. The UDC adopts a packet cross compression method, that is, the base station decompresses the newly received compressed packet according to the previously received data information, as a result, consistency of the compression buffer and the decompression buffer on the two sides of the base station and the UE cannot be ensured, and reliability of the uplink data compression cannot be guaranteed.

SUMMARY

In view of the above, embodiments of the present disclosure provide a method and a device for decompressing and compressing uplink data, which ensure that a compression buffer area of a compression end keeps consistent with a decompression buffer area of a decompression end, thereby ensuring reliability of uplink data compression.

According to a first aspect of the embodiments of the present disclosure, a method for decompressing uplink data is provided, which includes:

checking, by a decompression end, a UDC header in a PDCP packet after the PDCP packet is received by the decompression end, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and performing, by the decompression end, a corresponding operation on the data packet in the PDCP packet according to the compression context information and the information related to the decompression buffer area.

Optionally, the PDCP packet includes: a header of the PDCP packet, the UDC header, and the data packet, and the UDC header is between the header of the PDCP packet and the data packet.

Optionally, the UDC header includes one or more of:

a first indication bit field for indicating whether UDC compression is performed;

a second indication bit field for indicating decompression buffer area resetting; or a third indication bit field for indicating decompression buffer area checking.

Optionally, the UDC header further includes:

a fourth indication bit field for indicating whether the data packet is to enter the decompression buffer area; or a reserved bit field.

Optionally, the performing, by the decompression end, the corresponding operation on the data packet in the PDCP packet according to the compression context information and the information related to the decompression buffer area includes:

transmitting, by the decompression end directly, the data packet to an upper layer, in a case that the first indication bit field in the UDC header has a first value indicating that UDC compression is not performed;

checking, by the decompression end, the second indication bit field in the UDC header for indicating the decompression buffer area resetting, in a case that the first indication bit field has a second value indicating that UDC compression is performed;

clearing the decompression buffer area, in a case that the second indication bit field has a third value indicating that the decompression buffer area resetting needs to be performed, where the third indication bit field for indicating the decompression buffer area checking does not need to be checked, and UDC decompression is performed on the data packet directly;

continuing to check the third indication bit field for indicating the decompression buffer area checking, in a case that the second indication bit field has a fourth value indicating that the decompression buffer area resetting does not need to be performed; and checking, by the decompression end, data in the decompression buffer area, and taking n bits from the decompression buffer area, in a case that the third indication bit field is n bits, and performing UDC decompression on the data packet in a case that the taken n bits are the same as the third indication bit field in the UDC header; otherwise, initiating a reset process and instructing the compression end to perform a reset of the compression buffer area, where n is a positive integer.

Optionally, taking n bits from the compression buffer area includes:

superimposing based on the entire byte or superimposing all bits in the decompression buffer area, and taking the last n bits.

Optionally, the method further includes:

storing the data packet in the decompression buffer area, in a case that the UDC header includes the second indication bit field for indicating whether the data packet is to enter the decompression buffer area, and the second indication bit field has a fifth value indicating that the data packet needs to enter the decompression buffer area, where the data packet is an uncompressed data packet or a decompressed data packet;

where, in a case that the UDC header includes the second indication bit field for indicating whether the data packet is to enter the decompression buffer area, and the second indication bit field has a sixth value indicating that the data packet does not need to enter the decompression buffer area, the data packet is not stored in the decompression buffer area.

According to a second aspect of the embodiments of the present disclosure, a method for compressing uplink data is further provided, which includes:

transmitting, by a compression end, a PDCP packet to a decompression end such that the decompression end checks a UDC header in the PDCP packet, where the UDC header includes at least: compression context information of a data packet in the PDCP packet and information related to a decompression buffer area; a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end.

Optionally, the PDCP packet includes: a header of the PDCP packet, the UDC header, and the data packet, and the UDC header is between the header of the PDCP packet and the data packet.

Optionally, the UDC header includes one or more of:

a first indication bit field for indicating whether UDC compression is performed;

a second indication bit field for indicating decompression buffer area resetting; or a third indication bit field for indicating decompression buffer area checking.

Optionally, the method further includes:

setting, by the compression end, the first indication bit field for indicating whether UDC compression is performed as a second value, in a case that UDC compression is performed on the data packet in the PDCP packet; otherwise, setting, by the compression end, the first indication bit field as a first value; and superimposing, by the compression end, data in the compression buffer area before the compression, in a case the first indication bit field is set as the second value, calculating the third indication bit field for indicating the decompression buffer area checking, and putting it in the UDC header.

Optionally, the UDC header further includes:

a fourth indication bit field for indicating whether the data packet is to enter the decompression buffer area; or a reserved bit field.

Optionally, the method further includes:

setting, by the compression end, the fourth indication bit field in the UDC header for indicating whether the data packet is to enter the decompression buffer area as a fifth value, in a case that the data packet needs to enter the compression buffer area; and setting, by the compression end, the fourth indication bit field in the UDC header for indicating whether the data packet is to enter the decompression buffer area as a sixth value, in a case that the data packet does not need to enter the compression buffer area.

According to a third aspect of the embodiments of the present disclosure, a decompression end is further provided, which includes:

a checking module, configured to check a UDC header in a PDCP packet after the PDCP packet is received by the checking module, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and a first processing module, configured to perform a corresponding operation on the data packet in the PDCP packet according to the compression context information and the information related to the decompression buffer area.

Optionally, the PDCP packet includes: a header of the PDCP packet, the UDC header, and the data packet, and the UDC header is between the header of the PDCP packet and the data packet.

Optionally, the UDC header includes one or more of:

a first indication bit field for indicating whether UDC compression is performed;

a second indication bit field for indicating decompression buffer area resetting; or a third indication bit field for indicating decompression buffer area checking.

Optionally, the UDC header further includes:

a fourth indication bit field for indicating whether the data packet is to enter the decompression buffer area; or a reserved bit field.

Optionally, the first processing module is further configured to:

in a case that the first indication bit field in the UDC header has a first value indicating that UDC compression is not performed, enable the decompression end to directly transmit the data packet to an upper layer;

in a case that the first indication bit field has a second value indicating that UDC compression is performed, enable the decompression end to check the second indication bit field in the UDC header for indicating the decompression buffer area resetting;

in a case that the second indication bit field has a third value indicating that the decompression buffer area resetting needs to be performed, clear the decompression buffer area, where the third indication bit field for indicating the decompression buffer area checking does not need to be checked, and UDC decompression is performed on the data packet directly;

in a case that the second indication bit field has a fourth value indicating that the decompression buffer area resetting does not need to be performed, continue to check the third indication bit field for indicating the decompression buffer area checking; and in a case that the third indication bit field is n bits, enable the decompression end to check data in the decompression buffer area, and take n bits from the decompression buffer area, and in a case that the taken n bits are the same as the third indication bit field in the UDC header, perform UDC decompression on the data packet; otherwise, initiate a reset process and instruct the compression end to perform a reset of the compression buffer area, where n is a positive integer.

Optionally, the decompression end further includes:

a second processing module configured to, in a case that the UDC header includes the second indication bit field for indicating whether the data packet is to enter the decompression buffer area, and the second indication bit field has a fifth value indicating that the data packet needs to enter the decompression buffer area, store the data packet in the decompression buffer area, where the data packet is an uncompressed data packet or a decompressed data packet;

in a case that the UDC header includes the second indication bit field for indicating whether the data packet is to enter the decompression buffer area, and the second indication bit field has a sixth value indicating that the data packet does not need to enter the decompression buffer area, the data packet is not stored in the decompression buffer area.

According to a fourth aspect of the embodiments of the present disclosure, a compression end is further provided, which includes:

a transmitting module, configured to transmit a PDCP packet to a decompression end such that the decompression end checks a UDC header in the PDCP packet, where the UDC header includes at least: compression context information of a data packet in the PDCP packet and information related to a decompression buffer area; a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end.

Optionally, the PDCP packet includes: a header of the PDCP packet, the UDC header, and the data packet, and the UDC header is between the header of the PDCP packet and the data packet.

Optionally, the UDC header includes one or more of:

a first indication bit field for indicating whether UDC compression is performed;

a second indication bit field for indicating decompression buffer area resetting; or a third indication bit field for indicating decompression buffer area checking.

Optionally, the compression end further includes:

a first setting module configured to, in a case that UDC compression is performed on the data packet in the PDCP packet set the first indication bit field for indicating whether UDC compression is performed as a second value, otherwise, enable the compression end to set the first indication bit field as a first value; or in a case the first indication bit field is set as the second value, superimpose data in the compression buffer area before the compression, calculate the third indication bit field for indicating decompression buffer area checking, and put it in the UDC header.

Optionally, the UDC header further includes:

a fourth indication bit field for indicating whether the data packet is to enter the decompression buffer area; or a reserved bit field.

Optionally, the compression end further includes:

a second setting module configured to, in a case that the data packet needs to enter the compression buffer area, set the fourth indication bit field in the UDC header for indicating whether the data packet is to enter the decompression buffer area as a fifth value; and in a case that the data packet does not need to enter the compression buffer area, set the fourth indication bit field in the UDC header for indicating whether the data packet is to enter the decompression buffer area as a sixth value.

According to a fifth aspect of the embodiments of the present disclosure, a decompression end is further provided, which includes: a first memory, a first processor, and a computer program stored in the first memory and executable by the first processor, when the computer program is executed by the first processor, steps in the method for decompressing uplink data according to the above first aspect are implemented.

According to a sixth aspect of the embodiments of the present disclosure, a compression end is further provided, which includes: a second memory, a second processor, and a computer program stored in the second memory and executable by the second processor, when the computer program is executed by the second processor, steps in the method for compressing uplink data according to the above second aspect are implemented.

According to a seventh aspect of the embodiments of the present disclosure, a computer readable storage medium is further provided, on which a computer program is stored, when the computer program is executed by a processor, steps in the method for decompressing uplink data according to the above first aspect are implemented, or steps in the method for compressing uplink data according to the above second aspect are implemented.

A technical solution of the above technical solutions has the following advantages or advantageous effects. The UDC header is added in the PDCP packet, where the UDC header includes at least the compression context information of the data packet in the PDCP packet and the information related to the decompression buffer area, and the information related to the decompression buffer area is for indicating the decompression end to control the decompression buffer area of the decompression end to keep consistent with the compression buffer area of the compression end; and the decompression end performs the corresponding operation on the data packet in the PDCP packet according to the compression context information and the information related to the decompression buffer area. In this way, the decompression end controls the decompression buffer area to keep consistent with the compression buffer area of the compression end according to the information related to the decompression buffer area. As such, the problem that consistency between the compression buffer and the decompression buffer on the two sides of base station and UE cannot be ensured in the related technologies is solved, thereby improving reliability of uplink data compression.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

Exemplary embodiments of the present disclosure will be described in more detail with reference to the accompanying drawings hereinafter. While the exemplary embodiments of the present disclosure are shown in the drawings, it should be understood that the present disclosure may be carried out in various forms without being limited by the embodiments set forth herein. Rather, these embodiments are provided so that the present disclosure can be understood more thoroughly and the scope of the present disclosure can be fully conveyed to a person skilled in the art.

In embodiments of the present disclosure, the UDC compression algorithm as used is a compression algorithm of the published Request for Comments (RFC) 1951. For details, please refer to the RFC 1951 document of the Internet Engineering Task Force (IETF).

Figure 5:
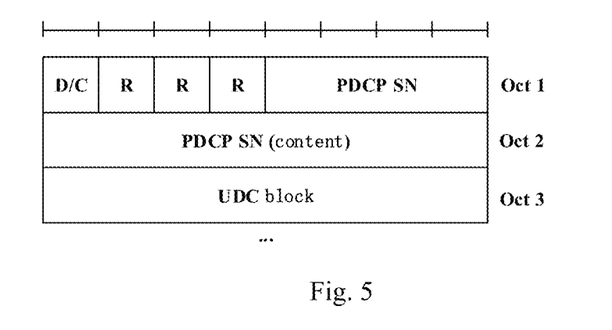
FIG. 5 is a schematic view of a PDCP PDU format.
Figure 6:
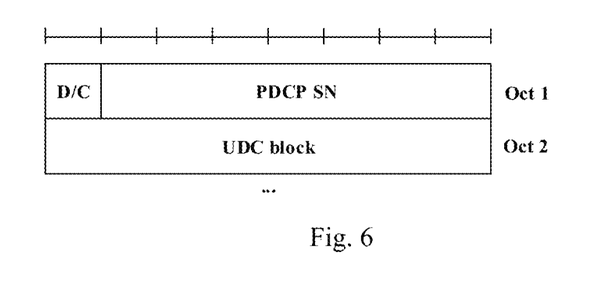
FIG. 6 is another schematic view of a PDCP PDU format.
Figure 7:
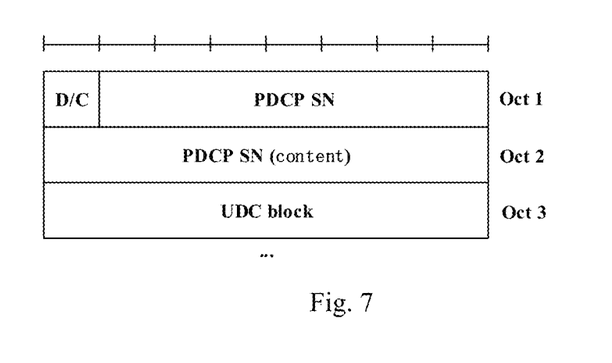
FIG. 7 is still another schematic view of a PDCP PDU format.

Referring to FIGS. 5, 6, and 7, format of a PDCP packet after the UDC compression is shown. A UDC block in the figures is a data packet compressed with RFC1951, and the compression object is a PDCP SDU (Service Data Unit), i.e., a data packet sent transmitted from an upper layer.

Figure 8:
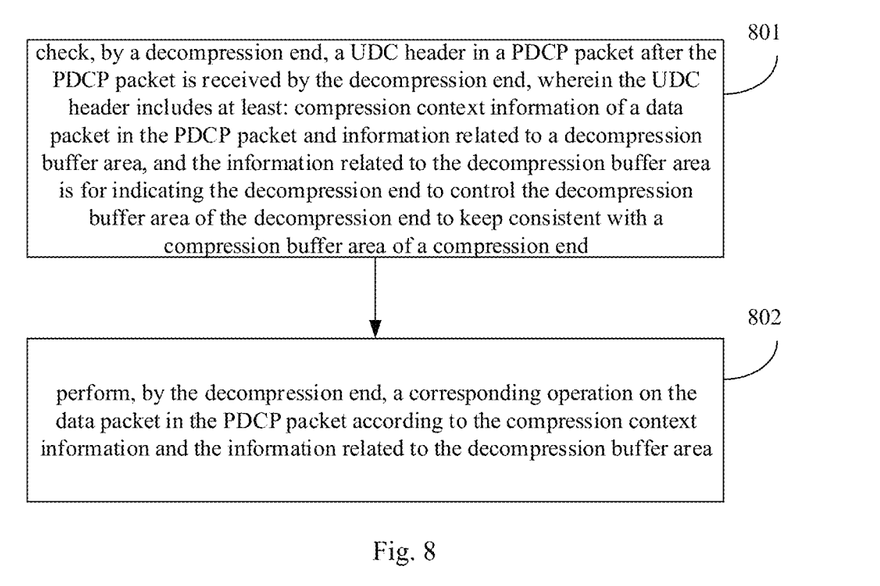
FIG. 8 is a flowchart of a method for decompressing uplink data according to an embodiment of the present disclosure.

Referring to FIG. 8, a method for decompressing uplink data is shown, which includes the following steps.

Step 801: checking, by a decompression end, a UDC header in a PDCP packet after the PDCP packet is received by the decompression end, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end.

The above compression context information may be an indication bit field for indicating whether UDC compression is performed. The above information related to the decompression buffer area may include an indication bit field indicating compression buffer area resetting and an indication bit field for decompression buffer area checking. By using the information related to the decompression buffer area, consistency between the compression buffer area of the compression end and the decompression buffer area of the decompression end can be effectively ensured, thereby improving reliability of uplink data compression.

In the embodiment, the decompression end refers to an entity where the network side PDCP is located. For example, the decompression end refers to the PDCP layer of a base station, and the PDCP layer is located in a base station or a centralized unit (CU) of a distributed base station.

Step 802: performing, by the decompression end, a corresponding operation on the data packet in the PDCP packet according to the compression context information and the information related to the decompression buffer area.

In the embodiment, optionally, the PDCP packet includes: a header of the PDCP packet, the UDC header, and the data packet, and the UDC header is between the header of the PDCP packet and the data packet.

In the embodiment, optionally, the UDC header includes one or more of the followings:

a first indication bit field for indicating whether UDC compression is performed;

a second indication bit field for indicating decompression buffer area resetting; or a third indication bit field for indicating decompression buffer area checking.

In the embodiment, optionally, the UDC header further includes a fourth indication bit field for indicating whether the data packet is to enter the decompression buffer area; or a reserved bit field.

Specifically, in conjunction with the structure of the above UDC header, the decompression end may perform the corresponding operation on the data packet in the PDCP packet in the following way in the embodiment:

in a case that the first indication bit field in the UDC header has a first value indicating that UDC compression is not performed, the decompression end directly transmits the data packet to an upper layer;

in a case that the first indication bit field has a second value indicating that UDC compression is performed, the decompression end checks the second indication bit field in the UDC header for indicating the decompression buffer area resetting;

in a case that the second indication bit field has a third value indicating that the decompression buffer area resetting needs to be performed, the decompression buffer area is cleared, the third indication bit field for indicating the decompression buffer area checking is not required to be checked, and UDC decompression is performed on the data packet directly;

in a case that the second indication bit field has a fourth value indicating that the decompression buffer area resetting is not required, the third indication bit field for indicating the decompression buffer area checking is continued to be checked; and in a case that the third indication bit field is n bits, the decompression end checks data in the decompression buffer area, and takes n bits from the decompression buffer area, and in a case that the taken n bits are the same as the third indication bit field in the UDC header, UDC decompression is performed on the data packet, and the decompressed data pack enters the decompression buffer area; otherwise, a reset process is initiated, and the compression end is instructed to perform a reset of the compression buffer area, where n is a positive integer.

The above way of taking n bits from the compression buffer area may be: superimposing according to the entire byte or superimposing all bits in the decompression buffer area, and taking the last n bits.

Optionally, in the embodiment, in a case that the UDC header includes the second indication bit field for indicating whether the data packet is to enter the decompression buffer area, and the second indication bit field has a fifth value indicating that the data packet needs to enter the decompression buffer area, the data packet is stored in the decompression buffer area, where the data packet is an uncompressed data packet or a decompressed data packet;

in a case that the UDC header includes the second indication bit field for indicating whether the data packet is to enter the decompression buffer area, and the second indication bit field has a sixth value indicating that the data packet does not need to enter the decompression buffer area, the data packet is not stored in the decompression buffer area.

In the embodiment, the UDC header is added in the PDCP packet, the UDC header includes at least the compression context information of the data packet in the PDCP packet and the information related to the decompression buffer area, and the decompression end is capable of performing the corresponding operation on the data packet in the PDCP packet according to the compression context information and the information related to the decompression buffer area. In this way, the decompression end controls the decompression buffer area to keep consistent with the compression buffer area of the compression end according to the information related to the decompression buffer area. As such, the problem that consistency between the compression buffer and the decompression buffer on the two sides of base station and UE cannot be ensured in the related technologies is solved, thereby improving reliability of uplink data compression.

Figure 9:
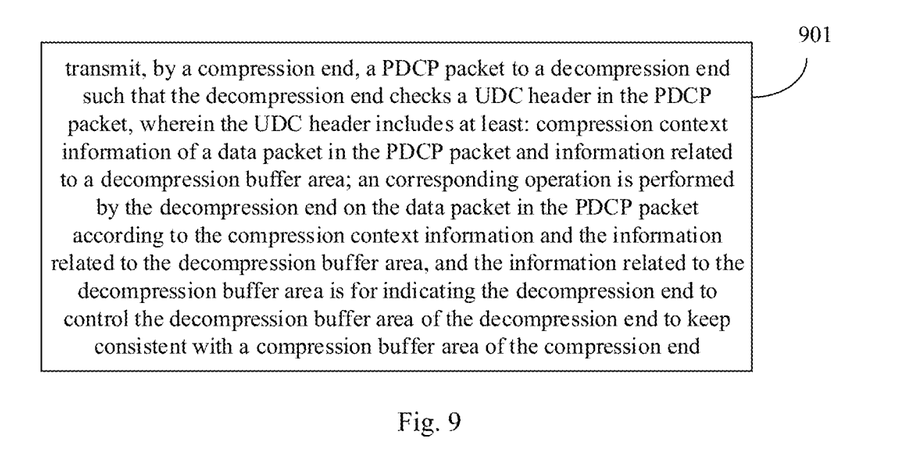
FIG. 9 is a flowchart of a method for compressing uplink data according to an embodiment of the present disclosure.

Referring to FIG. 9, a method for compressing uplink data is shown, which includes the following step.

Step 901: transmitting, by a compression end, a PDCP packet to a decompression end such that the decompression end checks a UDC header in the PDCP packet, where the UDC header includes at least: compression context information of a data packet in the PDCP packet and information related to a decompression buffer area; a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end.

In the embodiment, the above compression end refers to an entity where the User Equipment (UE) side PDCP is located, and the entity has a function of performing UDC compression on uplink data; for example, the compression end may correspond to the UE.

In the embodiment, optionally, the PDCP packet includes: a header of the PDCP packet, the UDC header, and the data packet, and the UDC header is between the header of the PDCP packet and the data packet.

In the embodiment, optionally, the UDC header includes one or more of the followings:

a first indication bit field for indicating whether UDC compression is performed;

a second indication bit field for indicating decompression buffer area resetting; or a third indication bit field for indicating decompression buffer area checking.

In the embodiment, optionally, the method further includes:

in a case that UDC compression is performed on the data packet in the PDCP packet, setting, by the compression end, the first indication bit field for indicating whether UDC compression is performed as a second value; otherwise, setting, by the compression end, the first indication bit field as a first value; and in a case the first indication bit field is set as the second value, superimposing, by the compression end, data in the compression buffer area before the compression, calculating the third indication bit field for indicating decompression buffer area checking, and putting it in the UDC header.

In the embodiment, optionally, the UDC header further includes a fourth indication bit field for indicating whether the data packet is to enter the decompression buffer area; or a reserved bit field.

In the embodiment, optionally, the method further includes:

in a case that the data packet needs to enter the compression buffer area, setting, by the compression end, the fourth indication bit field in the UDC header for indicating whether the data packet is to enter the decompression buffer area as a fifth value; and in a case that the data packet does not need to enter the compression buffer area, setting, by the compression end, the fourth indication bit field in the UDC header for indicating whether the data packet is to enter the decompression buffer area as a sixth value.

In the embodiment, the decompression end is capable of controlling the decompression buffer area to keep consistent with the compression buffer area of the compression end according to the information related to the decompression buffer area in the UDC header. As such, the problem that consistency between the compression buffer and the decompression buffer on the two sides of base station and UE cannot be ensured in the related technologies is solved, thereby improving reliability of uplink data compression.

In another embodiment of the present disclosure, a UDC header is added between the header of the PDCP and the data packet (which may also be referred to as a UDC compressed packet), and the UDC header may cover one or more of the following fields:

an indication bit field for indicating whether UDC compression is performed;

an indication bit field for indicating buffer area resetting; and an indication bit field for indicating buffer area checking.

Optionally, the UDC header further includes an indication bit field for indicating whether the packet is to enter the buffer area.

Optionally, the UDC header further includes a reserved bit field.

In the embodiment, after the decompression end receives the data packet, it checks the UDC header, and performs a decompression operation of UDC. The decompression end may be a base station.

The specific behavior of the decompression end is described as follows:

in step 1, the decompression end checks the indication bit field for indicating whether UDC compression is performed; if the UDC compression is not performed, the UDC decompression step is skipped, and the PDCP SDU is directly delivered to the upper layer; and if the UDC compression is performed, the process proceeds to step 2;

in step 2, the indication bit field for indicating buffer area resetting is checked; if it is set to 1, the decompress buffer area is cleared, the indication bit field for indicating buffer area checking is not required to be checked, and the decompression module of UDC proceeds to decompress; and if it is set to 0, checking of the indication bit field for indicating the buffer area checking is continued.

Assuming that the indication bit field for indicating the buffer area checking is n bits (n may be 1-7, for example, 4), the decompression end checks the data in the decompression buffer area. For example, it superimposes according to the entire byte or superimposes all the bits in the buffer area, and takes the last n bits. If the taken n bits are the same as the indication bit field in the received UDC header for indicating decompression buffer area checking, they are considered to be consistent, and UDC decompression may be performed; and if they are inconsistent, a reset process is initiated, and the compression end is instructed to perform a reset of the compression buffer area.

Optionally, the behavior of the decompression end may further include step 3: if the header of the UDC carries an indication bit field for indicating whether the data packet is to enter the buffer area and the indication bit field is 1, then regardless of whether the data packet is a UDC compressed packet, the data in the data packet (uncompressed data packet or decompressed data) is compressed into the decompression buffer area for saving; and if the indication bit field is 0, the data in the data packet is not compressed into the decompression buffer area.

The specific behavior of the compression end is described as follows:

Step 1: whether to perform compression may be determined according to the configuration on the network side. For example, if the compression ratio exceeds a certain threshold (for example, 10% or more is compressed), it is determined that the compressed packet is transmitted, and the indication bit field for indicating whether UDC compression is performed is set to 1; otherwise, the indication bit field for indicating whether UDC compression is performed is set to 0.

Step 2: if the indication bit field for indicating whether UDC compression is performed is set to 1, summing operation is performed on the compression buffer area before compression, and the indication bit field for indicating decompression buffer area checking is calculated and put in the header of the UDC.

Step 3: if the packet of data is to enter the compression buffer area, the indication bit field in the UDC header for indicating whether the data packet is to enter the buffer area is set to 1, otherwise, the indication bit field for indicating whether the data packet is to enter the buffer area is set to 0.

Embodiment 1: There are Three Fields in the UDC Header

Figure 10:
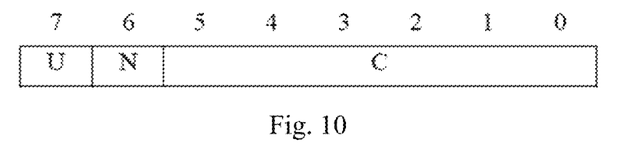
FIG. 10 is a schematic view of a format of a UDC header with three fields in an embodiment of the present disclosure.

Referring to FIG. 10, format of a UDC header includes the following information:

an indication bit field for indicating whether UDC compression is performed (U: 1 bit);

an indication bit field for indicating whether to reset the decompression buffer area (N: 1 bit); and an indication bit field for indicating decompression buffer area checking (C information: 6 bits).

The PDCP layer of the UE performs UDC compression on the data transmitted from the upper layer. If it is determined to transmit the compressed data packet to the network, U is set to 1, the data in the compression buffer area before compression is superimposed, and the last 6 bits of information are put in the C field of UDC.

If it is determined not to compress the packet of data, U is set to 0. A default value or an arbitrary value may be put in the C field, or the last 6 bits of the compression buffer area after superimposition may be put in the C field.

If it is required for the UE to reset the compression buffer area according to configuration of the network side or when the compression buffer area is found to have a problem, the N field is set to 1; otherwise, it is set to 0.

After the base station receives the packet of data, if U is 0, the header portion of the UDC is skipped, decompression is not performed, and the subsequent data packet is directly delivered to the upper layer. If the N field is 1, the data in the decompression buffer area is cleared. If U is 1 and the N field is 0, the data in the decompression buffer area is checked and superimposed, and the last 6 bits are taken. If the last 6 bits are the same as the check bit field of the C field in the header of the UDC as received, they are considered to be consistent, and the UDC decompression module may be entered for decompression. At the same time, the decompressed data packet enters the decompression buffer area.

It should be noted that, the data superposition of the compression buffer area may be implemented in various ways, such as superimposing according to entire byte and taking the last n bits, or superposing according to bit and taking the last n bits. The specific way may be agreed by protocol.

Embodiment 2: There are Four Fields in the UDC Header

Figure 11:
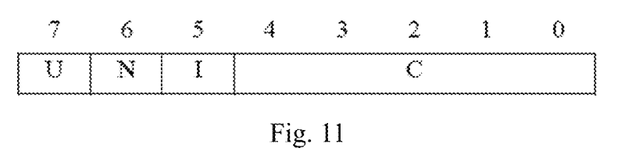
FIG. 11 is a schematic view of a format of a UDC header with four fields in an embodiment of the present disclosure.

Referring to FIG. 11, format of a UDC header includes the following information:

an indication bit field for indicating whether UDC compression is performed (U: 1 bit);

an indication bit field for indicating whether to reset the decompression buffer area (N: 1 bit);

an indication bit field for indicating whether to enter the decompression buffer area (I: 1 bit); and an indication bit field for indicating decompression buffer area checking (C information: 6 bits).

Similar to the above described Embodiment 1, the usages of the U field, the N field, and the C field in Embodiment 2 are the same as those in Embodiment 1. How to use the above I field is described below. The I field indicates whether the packet of data is going to enter the decompression buffer area. Regardless of whether the data packet is compressed, once I is set to 1, the base station compresses the uncompressed data packet (in a case that U is 0) or the decompressed data packet (in a case that U is 1) into the decompression buffer area.

Embodiment 3: There are Five Fields in the UDC Header

Figure 12:
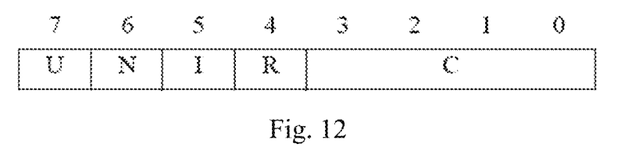
FIG. 12 is a schematic view of a format of a UDC header with five fields in an embodiment of the present disclosure.

Referring to FIG. 12, format of a UDC header includes the following information:

an indication bit field configured to indicate whether UDC compression is preformed (U: 1 bit);

an indication bit field for indicating whether to reset the buffer area (N: 1 bit);

an indication bit field for indicating whether to enter the buffer area (I: 1 bit);

an indication bit field for indicating buffer area checking (C information: 4 bits); and a reserved bit field (R: 2 bits).

The usages of the U field, the I field, and the C field in Embodiment 3 are the same as those in Embodiment 1 and Embodiment 2, except for the fact that the C field of 4 bits is used in Embodiment 3. There are two bits of R field whose function is not defined temporarily, and are left for future use.

Embodiment 4: Location of UDC Header

Figure 13:
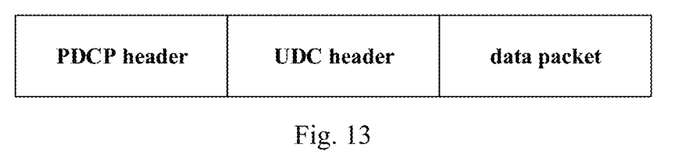
FIG. 13 is a schematic view of a PDCP PDU format with a UDC header in an embodiment of the present disclosure.

Referring to FIG. 13, when a Data Resource Bearer (DRB) is configured to use the UDC, a 1-byte UDC header is inserted between the original PDCP header and the data portion. The UDC header always exists during UDC activation.

Embodiment 5: A Case of Inconsistency in the Check Field C Field of the Buffer Area In a case that the decompression end finds that the indication bit field for indicating the decompression buffer area checking is inconsistent with the information in the received data packet, all the information of the decompression buffer area is cleared, and the indication bit field for indicating the decompression buffer area checking is set to 0, and is notified to the compression end (i.e., the UE) through signaling.

Optionally, the signaling may be RRC signaling, such as indicating clearing the UDC compression buffer area of a certain DRB in a reconfiguration message.

Optionally, the signaling may also be a control PDU of a new PDCP or a 1-bit indication information carried in the control PDU of the existing PDCP. For example, the R bit field in the control PDU is redefined to indicate resetting the buffer area.

When the compression end receives the reset indication information, the compression buffer area is cleared, and the reset indication bit field in the PDU in the previous embodiments indicates that the decompression end has performed reset to ensure that the statuses of the buffer areas on both sides are consistent.

Based on the same inventive concept, a decompression end is further provided in an embodiment of the present disclosure. The principle of solving the problem by the decompression end is similar to that of the method for decompressing the uplink data shown in FIG. 8 in the embodiment of the present disclosure. Therefore, for the implementation of the decompression end, reference may be made to the implementation of the method, and repeated description is omitted herein.

Figure 14:
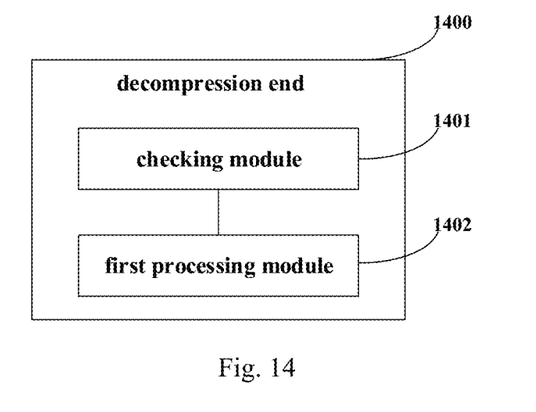
FIG. 14 is a schematic structural view of a decompression end in an embodiment of the present disclosure.

Referring to FIG. 14, a structure of a decompression end is shown, and the decompression end 1400 includes:

a checking module 1401, configured to check a UDC header in a PDCP packet after the PDCP packet is received by the checking module, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and a first processing module 1402, configured to perform a corresponding operation on the data packet in the PDCP packet according to the compression context information and the information related to the decompression buffer area.

In the embodiment, optionally, the PDCP packet includes: a header of the PDCP packet, the UDC header, and the data packet, and the UDC header is between the header of the PDCP packet and the data packet.

In the embodiment, optionally, the UDC header includes one or more of the followings:

a first indication bit field for indicating whether UDC compression is performed;

a second indication bit field for indicating decompression buffer area resetting; or a third indication bit field for indicating decompression buffer area checking.

In the embodiment, optionally, the UDC header further includes:

a fourth indication bit field for indicating whether the data packet is to enter the decompression buffer area; or a reserved bit field.

In the embodiment, optionally, the processing module is further configured to:

in a case that the first indication bit field in the UDC header has a first value indicating that UDC compression is not performed, enable the decompression end to directly transmit the data packet to an upper layer;

in a case that the first indication bit field has a second value indicating that UDC compression is performed, enable the decompression end to check the second indication bit field in the UDC header for indicating the decompression buffer area resetting;

in a case that the second indication bit field has a third value indicating that the decompression buffer area resetting needs to be performed, clear the decompression buffer area, where the third indication bit field for indicating the decompression buffer area checking is not required to be checked, and UDC decompression is performed on the data packet directly;

in a case that the second indication bit field has a fourth value indicating that the decompression buffer area resetting is not required, continue to check the third indication bit field for indicating the decompression buffer area checking; and in a case that the third indication bit field is n bits, enable the decompression end to check data in the decompression buffer area, and take n bits from the decompression buffer area, and in a case that the taken n bits are the same as the third indication bit field in the UDC header, perform UDC decompression on the data packet; otherwise, initiate a reset process and instruct the compression end to perform a reset of the compression buffer area, where n is a positive integer.

In the embodiment, optionally, the decompression end further includes:

a second processing module configured to, in a case that the UDC header includes the second indication bit field for indicating whether the data packet is to enter the decompression buffer area, and the second indication bit field has a fifth value indicating that the data packet needs to enter the decompression buffer area, store the data packet in the decompression buffer area, where the data packet is an uncompressed data packet or a decompressed data packet;

in a case that the UDC header includes the second indication bit field for indicating whether the data packet is to enter the decompression buffer area, and the second indication bit field has a sixth value indicating that the data packet does not need to enter the decompression buffer area, the data packet is not stored in the decompression buffer area.

Based on the same inventive concept, a compression end is further provided in an embodiment of the present disclosure. The principle of solving the problem by the compression end is similar to that of the method for compressing the uplink data shown in FIG. 9 in the embodiment of the present disclosure. Therefore, for the implementation of the compression end, reference may be made to the implementation of the method, and repeated description is omitted herein.

Figure 15:
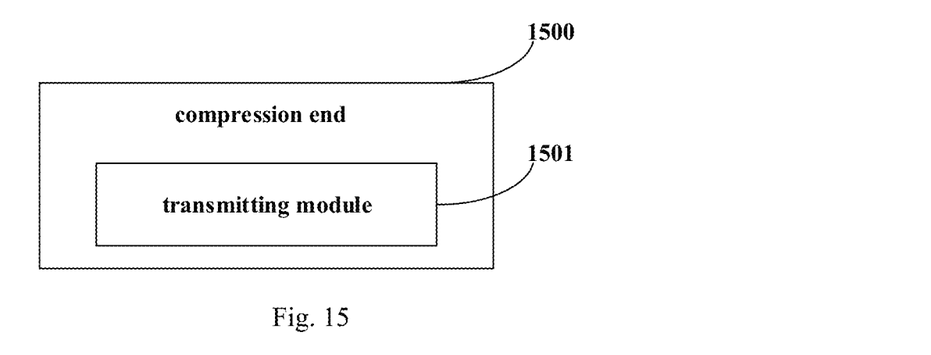
FIG. 15 is a schematic structural view of a compression end in an embodiment of the present disclosure.

Referring to FIG. 15, a structure of a compression end is shown, and the compression end 1500 includes:

a transmitting module 1501, configured to transmit a PDCP packet to a decompression end such that the decompression end checks a UDC header in the PDCP packet, where the UDC header includes at least: compression context information of a data packet in the PDCP packet and information related to a decompression buffer area; a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end.

In the embodiment, optionally, the PDCP packet includes: a header of the PDCP packet, the UDC header, and the data packet, and the UDC header is between the header of the PDCP packet and the data packet.

In the embodiment, optionally, the UDC header includes one or more of the followings:

a first indication bit field for indicating whether UDC compression is performed;

a second indication bit field for indicating decompression buffer area resetting; or a third indication bit field for indicating decompression buffer area checking.

In the embodiment, optionally, the compression end further includes:

a first setting module configured to, in a case that UDC compression is performed on the data packet in the PDCP packet, set the first indication bit field for indicating whether UDC compression is performed as a second value, otherwise, enable the compression end to set the first indication bit field as a first value; or in a case the first indication bit field is set as the second value, superimpose data in the compression buffer area before the compression, calculate the third indication bit field for indicating decompression buffer area checking, and put it in the UDC header.

In the embodiment, optionally, the UDC header further includes:

a fourth indication bit field for indicating whether the data packet is to enter the decompression buffer area; or a reserved bit field.

In the embodiment, optionally, the compression end further includes:

a second setting module configured to, in a case that the data packet needs to enter the compression buffer area, set the fourth indication bit field in the UDC header for indicating whether the data packet is to enter the decompression buffer area as a fifth value; and in a case that the data packet does not need to enter the compression buffer area, set the fourth indication bit field in the UDC header for indicating whether the data packet is to enter the decompression buffer area as a sixth value.

An embodiment of the present disclosure further provides a decompression end, which includes: a first memory, a first processor, and a computer program which is stored in the first memory and is capable of being executed by the first processor, when the program is executed by the first processor, steps in the above described method for decompressing uplink data are implemented.

Figure 16:
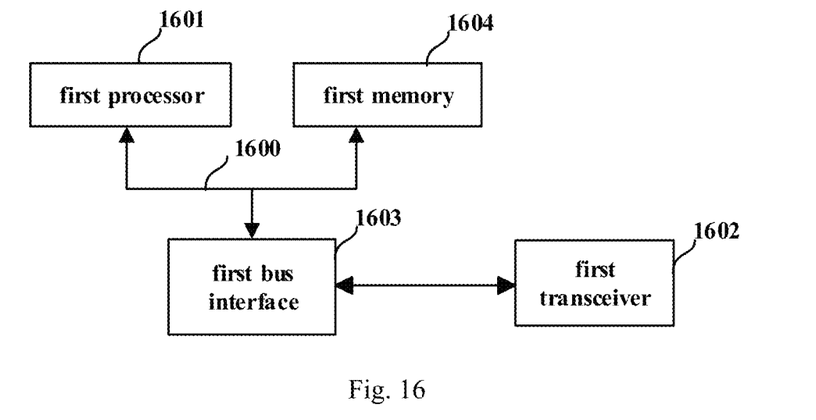
FIG. 16 is a schematic structural view of a decompression end in another embodiment of the present disclosure.

Referring to FIG. 16, a structure of a decompression end is shown, which includes: a first memory 1604, a first processor 1601, and a computer program which is stored in the first memory 1604 and is capable of being executed by the first processor 1601, when the program is executed by the first processor 1601, the following steps are implemented: checking a UDC header in a PDCP packet after the PDCP packet is received, where the UDC header includes at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and performing a corresponding operation on the data packet in the PDCP packet according to the compression context information and the information related to the decompression buffer area.

In FIG. 16, a bus architecture (represented by a first bus 1600) may include any quantity of interconnected buses and bridges. Various circuits including one or more processors represented by the first processor 1601 and a memory represented by the first memory 1604 are coupled via the first bus 1600. The first bus 1600 may further couple various other circuits together, such as a periphery component, a voltage stabilizer and a power management circuit. A first bus interface 1603 provides an interface between the first bus 1600 and a first transceiver 1602. The first transceiver 1602 may be one element, or multiple elements, such as multiple receivers and transmitters, providing a unit for communicating with various other devices on a transmission medium. For example, the first transceiver 1602 receives external data from other devices. The first transceiver 1602 is configured to transmit data processed by the first processor 1601 to other devices.

The first processor 1601 is in charge of managing the first bus 1600 and common processes, such as running a general operating system. The first memory 1604 may be configured to store data used by the first processor 1601 in performing operations.

Optionally, the first processor 1601 may be a CPU, an application specific integrated circuit (ASIC), a field-programmable gate array (FPGA), or a complex programmable logic device (CPLD).

An embodiment of the present disclosure further provides a compression end, which includes: a second memory, a second processor, and a computer program which is stored in the second memory and is capable of being executed by the second processor, when the program is executed by the second processor, steps in the above described method for compressing uplink data are implemented.

Figure 17:
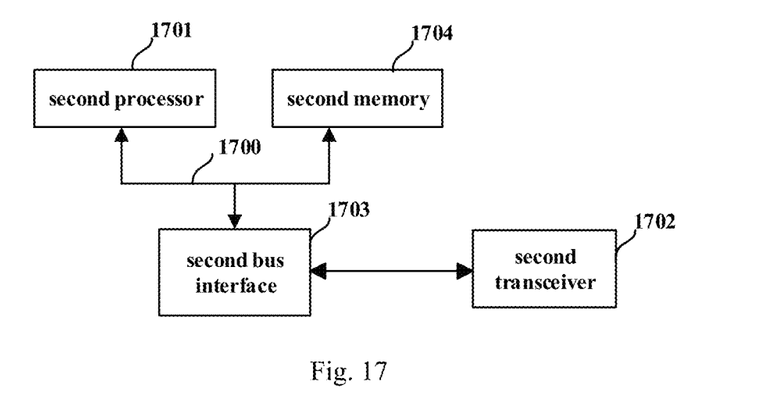
FIG. 17 is a schematic structural view of a compression end in another embodiment of the present disclosure.

Referring to FIG. 17, a structure of a compression end is shown, which includes: a second memory, a second processor, and a computer program which is stored in the second memory and is capable of being executed by the second processor, when the program is executed by the second processor, the following steps are implemented: transmitting a PDCP packet to a decompression end such that the decompression end checks a UDC header in the PDCP packet, where the UDC header includes at least: compression context information of a data packet in the PDCP packet and information related to a decompression buffer area; a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end.

In FIG. 17, a bus architecture (represented by a second bus 1700) may include any quantity of interconnected buses and bridges. Various circuits including one or more processors represented by the second processor 1701 and a memory represented by the second memory 1704 are coupled via the second bus 1700. The second bus 1700 may further couple various other circuits together, such as a periphery component, a voltage stabilizer and a power management circuit. A second bus interface 1703 provides an interface between the second bus 1700 and a second transceiver 1702. The second transceiver 1702 may be one element, or multiple elements, such as multiple receivers and transmitters, providing a unit for communicating with various other devices on a transmission medium. For example, the second transceiver 1702 receives external data from other devices. The second transceiver 1702 is configured to transmit data processed by the second processor 1701 to other devices. Depending on the nature of the computing system, a user interface 1105 may also be provided, such as a keypad, a display, a speaker, microphone, and a joystick.

The second processor 1701 is in charge of managing the second bus 1700 and common processes, such as running a general operating system. The second memory 1704 may be configured to store data used by the second processor 1701 in performing operations.

Optionally, the second processor 1701 may be a CPU, an application specific integrated circuit (ASIC), a field-programmable gate array (FPGA), or a complex programmable logic device (CPLD).

An embodiment of the present disclosure further provides a computer readable storage medium, on which a computer program is stored, when the program is executed by a processor, steps in the above described method for decompressing uplink data are implemented, or steps in the above described method for compressing uplink data are implemented.

It should be understood that "one embodiment" or "an embodiment" mentioned throughout the specification means that specific features, structures or characteristics associated with the embodiment are included in at least one embodiment of the present disclosure. Hence, terms of "according to one embodiment" or "according to an embodiment" in the specification are not limited to the same embodiment. In addition, those specific features, structures or characteristics can be combined in one or more embodiments in any appropriate manner It should be understood, numerical references for respective processes in the embodiments of the present disclosure do not indicate any execution sequence, and these numerical references are not to limit implementation processes of the embodiments of the present disclosure. Execution sequences of the processes are determined based on functions and internal logics of the processes.

In addition, terms of "system" and "network" in the specification may be interchanged.

It should be understood that, the term "and/or" merely describes a relationship between associated objects. Such term may indicate three situations. For example, A and/or B may indicate: mere A, both A and B, or mere B. Furthermore, the symbol "/" usually indicates an "or" relationship between associated objects prior to and after such symbol.

It should be understood that in the embodiments of the present disclosure, "B corresponding to A" indicates that B is associated with A and may be determined based on A. However, it should also be understood that determining B based on A does not mean determining B based on only A, and B may be determined based on A and/or other information.

It should be understood that the method and device provided in the embodiments of the present disclosure may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

Furthermore, functional units in the embodiments of the present disclosure may be integrated into one processing unit, or may be physically independent, or two or more units are integrated into one unit. The integrated units may be implemented by hardware or by combination of hardware and software functional units.

Integrated units implemented as software functional units may be stored on a computer readable storage medium. The software functional units are stored on a storage medium and include several instructions for enabling a computer device (which may be a personal computer, a server, a network apparatus or the like) to execute partial steps of methods according to embodiments of the present disclosure. The storage medium may include medium that can store program code, such as a USB flash disk, a mobile Hard Disk, a Read-Only Memory (ROM), a Random Access Memory (RAM), a magnetic disk or an optical disk.

Optional embodiments are described hereinabove. It should be noted that various improvements and polishments can be made by those ordinary skilled in the art without departing from the principle of the present disclosure. The improvements and polishments fall within the protection scope of the present disclosure.

What is claimed is:

1. A method for decompressing uplink data, comprising:
    checking, by a decompression end, an uplink data compression (UDC) header in a packet data convergence protocol (PDCP) packet after the PDCP packet is received by the decompression end, wherein the UDC header comprises at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and
    performing, by the decompression end, a corresponding operation on the data packet in the PDCP packet according to the compression context information and the information related to the decompression buffer area;
    wherein the UDC header comprises one or more of: a first indication bit field for indicating whether UDC compression is performed, a second indication bit field for indicating decompression buffer area resetting, or, a third indication bit field for indicating decompression buffer area checking;
    wherein the performing, by the decompression end, the corresponding operation on the data packet in the PDCP packet according to the compression context information and the information related to the decompression buffer area comprises:
    transmitting, by the decompression end, the data packet to an upper layer, in a case that the first indication bit field in the UDC header has a first value indicating that UDC compression is not performed;
    checking, by the decompression end, the second indication bit field in the UDC header for indicating the decompression buffer area resetting, in a case that the first indication bit field has a second value indicating that UDC compression is performed;
    clearing the decompression buffer area, in a case that the second indication bit field has a third value indicating that the decompression buffer area resetting needs to be performed, wherein the third indication bit field for indicating the decompression buffer area checking does not need to be checked, and UDC decompression is performed on the data packet;
    continuing to check the third indication bit field for indicating the decompression buffer area checking, in a case that the second indication bit field has a fourth value indicating that the decompression buffer area resetting does not need to be performed; and
    checking, by the decompression end, data in the decompression buffer area, and calculating based on the data in the decompression buffer area to generate n bits, in a case that the third indication bit field is n bits, and performing UDC decompression on the data packet in a case that the generated n bits are the same as the third indication bit field in the UDC header; otherwise, initiating a reset process and instructing the compression end to perform a reset of the compression buffer area, where n is a positive integer;
    wherein the calculating based on the data in the decompression buffer area to generate n bits comprises: superimposing based on entire byte or superimposing all bits in the decompression buffer area, and taking the last n bits.

2. The method according to claim 1, wherein the PDCP packet comprises: a header of the PDCP packet, the UDC header, and the data packet, and the UDC header is between the header of the PDCP packet and the data packet.

3. The method according to claim 1, wherein the UDC header further comprises:
    a fourth indication bit field for indicating whether the data packet is to enter the decompression buffer area; or a reserved bit field.

4. The method according to claim 3, further comprising:
    storing the data packet in the decompression buffer area, in a case that the UDC header comprises the fourth indication bit field for indicating whether the data packet is to enter the decompression buffer area, and the fourth indication bit field has a fifth value indicating that the data packet needs to enter the decompression buffer area, wherein the data packet is an uncompressed data packet or a decompressed data packet;
    wherein in a case that the UDC header comprises the fourth indication bit field for indicating whether the data packet is to enter the decompression buffer area, and the fourth indication bit field has a sixth value indicating that the data packet does not need to enter the decompression buffer area, the data packet is not stored in the decompression buffer area.

5. A method for compressing uplink data, comprising:
    transmitting, by a compression end, a PDCP packet to a decompression end such that the decompression end checks a UDC header in the PDCP packet, wherein the UDC header comprises at least: compression context information of a data packet in the PDCP packet and information related to a decompression buffer area;
    a corresponding operation is performed by the decompression end on the data packet in the PDCP packet according to the compression context information and the information related to the decompression buffer area, and the information related to the decompression buffer area is for indicating the decompression end to control the decompression buffer area of the decompression end to keep consistent with a compression buffer area of the compression end;
    wherein the UDC header comprises one or more of: a first indication bit field for indicating whether UDC compression is performed, a second indication bit field for indicating decompression buffer area resetting, or, a third indication bit field for indicating decompression buffer area checking;
    wherein the method further comprises:
    setting, by the compression end, the first indication bit field for indicating whether UDC compression is performed as a second value, in a case that UDC compression is performed on the data packet in the PDCP packet, otherwise, setting, by the compression end, the first indication bit field as a first value; and superimposing, by the compression end, data in the compression buffer area before the compression, in a case the first indication bit field is set as the second value, calculating the third indication bit field for indicating the decompression buffer area checking, and putting it in the UDC header.

6. The method according to claim 5, wherein the PDCP packet comprises: a header of the PDCP packet, the UDC header, and the data packet, and the UDC header is between the header of the PDCP packet and the data packet.

7. The method according to claim 5, wherein the UDC header further comprises:
a fourth indication bit field for indicating whether the data packet is to enter the decompression buffer area; or a reserved bit field;
the method further comprises:
setting, by the compression end, the fourth indication bit field in the UDC header for indicating whether the data packet is to enter the decompression buffer area as a fifth value, in a case that the data packet needs to enter the compression buffer area; and
setting, by the compression end, the fourth indication bit field in the UDC header for indicating whether the data packet is to enter the decompression buffer area as a sixth value, in a case that the data packet does not need to enter the compression buffer area.

8. A decompression end, comprising a first memory, a first processor, and a program stored in the first memory and executable by the first processor, wherein when the program is executed by the first processor, the first processor is configured to:
check a UDC header in a PDCP packet after the PDCP packet is received, wherein the UDC header comprises at least: compression context information of a data packet in the PDCP packet and information related to a decompression buffer area, and the information related to the decompression buffer area is for indicating the decompression end to control the decompression buffer area of the decompression end to keep consistent with a compression buffer area of a compression end; and
perform a corresponding operation on the data packet in the PDCP packet according to the compression context information and the information related to the decompression buffer area;
wherein the UDC header comprises one or more of: a first indication bit field for indicating whether UDC compression is performed, a second indication bit field for indicating decompression buffer area resetting, or, a third indication bit field for indicating decompression buffer area checking;
wherein the first processor is further configured to:
in a case that the first indication bit field in the UDC header has a first value indicating that UDC compression is not performed, enable the decompression end to transmit the data packet to an upper layer;
in a case that the first indication bit field has a second value indicating that UDC compression is performed, enable the decompression end to check the second indication bit field in the UDC header for indicating the decompression buffer area resetting;
in a case that the second indication bit field has a third value indicating that the decompression buffer area resetting needs to be performed, clear the decompression buffer area, wherein the third indication bit field for indicating the decompression buffer area checking does not need to be checked, and UDC decompression is performed on the data packet;
in a case that the second indication bit field has a fourth value indicating that the decompression buffer area resetting does not need to be performed, continue to check the third indication bit field for indicating the decompression buffer area checking; and
in a case that the third indication bit field is n bits, enable the decompression end to check data in the decompression buffer area, and calculate based on the data in the decompression buffer area to generate n bits, and in a case that the generated n bits are the same as the third indication bit field in the UDC header, perform UDC decompression on the data packet otherwise, initiate a reset process and instruct the compression end to perform a reset of the compression buffer area, where n is a positive integer;
wherein calculating based on the data in the decompression buffer area to generate n bits comprises: superimposing based on entire byte or superimposing all bits in the decompression buffer area, and taking the last n bits.

9. The decompression end according to claim 8, wherein the PDCP packet comprises: a header of the PDCP packet, the UDC header, and the data packet, and the UDC header is between the header of the PDCP packet and the data packet.

10. The decompression end according to claim 8, wherein the UDC header further comprises:
a fourth indication bit field for indicating whether the data packet is to enter the decompression buffer area; or a reserved bit field.

11. A compression end, comprising a second memory, a second processor, and a program stored in the second memory and executable by the second processor, wherein when the program is executed by second processor, steps in the method for compressing uplink data according to claim 5 are implemented.

12. The compression end according to claim 11, wherein the PDCP packet comprises: a header of the PDCP packet, the UDC header, and the data packet, and the UDC header is between the header of the PDCP packet and the data packet.

13. The compression end according to claim 11,
wherein the UDC header further comprises:
a fourth indication bit field for indicating whether the data packet is to enter the decompression buffer area; or a reserved bit field.

* * * * *